United States Patent [19]
Dumas et al.

[11] Patent Number: 5,430,721
[45] Date of Patent: Jul. 4, 1995

[54] METHOD FOR MANAGING THE THROUGHPUT OF DIGITALLY CODED MESSAGES TRANSPORTED THROUGH AN ASYNCHRONOUS NETWORK, PARTICULARLY AN ATM NETWORK, AND DEVICE FOR ITS EMBODIMENT

[75] Inventors: Pierre Dumas, Sevres; David Mouen Makoua, Nanterre, both of France

[73] Assignee: Thomson-CSF, Paris, France

[21] Appl. No.: 178,757

[22] Filed: Jan. 7, 1994

[30] Foreign Application Priority Data

Jan. 22, 1993 [FR] France ................. 93 00639

[51] Int. Cl.$^6$ .......................................... H04Q 11/04
[52] U.S. Cl. ........................................ 370/60.1; 370/60
[58] Field of Search ............... 370/60.1, 60, 94.1, 370/59, 64, 85.1, 84

[56] References Cited

U.S. PATENT DOCUMENTS

| | | | |
|---|---|---|---|
| 4,500,989 | 2/1985 | Dahod | 370/85.1 |
| 5,164,938 | 11/1992 | Jurkevich et al. | 370/60.1 |
| 5,189,672 | 2/1993 | Le Bihan | 370/60 |
| 5,241,536 | 8/1993 | Grimble et al. | 370/59 |
| 5,285,446 | 2/1994 | Yonehara | 370/60.1 |

FOREIGN PATENT DOCUMENTS 0422549 4/1991 European Pat. Off. .

OTHER PUBLICATIONS

M. Decina, International Conference on Communications, vol. 3, Jun. 1991, pp. 1258–1264, "Open Issues Regarding the Universal Application of ATM for Multiplexing and Switching in the B-ISDN."

Luigi Fratta, et al., European Transactions on Telecommunications and Related Technologies, vol. 3, No. 2, Apr. 1992, pp. 183–193, "Congestion Control Strategies in ATM Networks."

Pierre E. Boyer, et al., IEEE Network, Sep. 1992, pp. 38–49, "Spacing Cells Protects and Enhances Utilization of ATM Network Links."

Primary Examiner—Douglas W. Olms
Assistant Examiner—Shick Hom
Attorney, Agent, or Firm—Oblon, Spivak, McClelland, Maier & Neustadt

[57] ABSTRACT

The method according to the invention consists of a first step in which messages sent by the sending subscriber are segmented into cells, a second step in which initial processing is carried out on each cell in order to space them uniformly at a minimum time interval at least equal to a determined resolution time, a third step in which a second processing succeeding the initial processing is carried out in order to space groups of cells with the same throughput by a minimum time interval determined as a function of the throughput allocated to each network subscriber, and a fourth step in which cells thus spaced are transmitted in a determined virtual circuit on the network.

5 Claims, 8 Drawing Sheets

METHOD FOR MANAGING THE THROUGHPUT OF DIGITALLY CODED MESSAGES TRANSPORTED THROUGH AN ASYNCHRONOUS NETWORK, PARTICULARLY AN ATM NETWORK, AND DEVICE FOR ITS EMBODIMENT

BACKGROUND OF THE INVENTION

1. Field of the invention

This invention concerns a method for managing the throughput of digitally coded messages transported through an asynchronous network, particularly an ATM (Asynchronous Transfer Mode) network and a device for its embodiment.

2. Description of the Prior Art

The routing of speech, music, pictures, text and data in general have given rise to multiservice transmission systems.

Telecommunication systems are calling more and more upon a known asynchronous transmission technique, ATM, that accepts digital information with varied and irregular natures and throughputs.

Data streams output from different services are cut into fixed length segments. A header is associated with each segment, also called a data field and is used for routing data from a sending subscriber to a destination subscriber. The total forms a fixed length ATM cell that can be interpreted by what is called an ATM exchange, as a function of the contents of its header.

Transmission lines consisting of cables, radio links, optical fibers, etc., connect exchanges together to form a telecommunications network.

Each exchange is provided with routing information to switch incident ATM cells towards one of the adjacent exchanges.

Thus a virtual circuit can be made within the network corresponding to a routing determined by the cell header between a transmission terminal, or source, and a reception terminal, making use of a physical support materialized by transmission lines. A transmission line may be common to several virtual circuits. The ATM exchange therefore needs to multiplex cells output from different services on the same transmission line.

This multiplexing makes it necessary to estimate the useful throughput of the line, that may be very different depending on which service is considered, to ensure that the physical throughput limited by the transmission medium is sufficient.

However this time averaged estimate does not take account of the irregularity of the ATM transmission. For example a service put on hold for a given time may send a burst of cells all at once. This throughput peak can exceed the capacity of the line, which is harmful for the integrity of data from all services multiplexer on the line.

SUMMARY OF THE INVENTION

The purpose of this invention is to overcome this disadvantage.

Hence the purpose of the invention is a method of managing the throughput of digitally coded messages transported by an asynchronous network between at least one sending subscriber and one receiving subscriber, consisting of a first step of segmenting messages sent by the sender subscriber into cells, a second step performing initial processing on each cell in order to space them uniformly by a minimum time interval equal to at least a given resolution time, a third step performing secondary processing after the first processing in order to space groups of cells with the same throughput by a minimum time interval determined as a function of the throughput allocated to each network subscriber, and a fourth step in which the cells thus spaced are transmitted in a determined virtual circuit in the network, wherein the initial processing of cells in the second step consists of combining the header of each cell with a first field containing time information corresponding to the minimum imposed interval between any two consecutive cells transmitted in the network, and the secondary processing of cells in the third step consists of assigning a queue to each subscriber corresponding to a determined transmission throughput in the determined virtual circuit, and then distributing cells generated by the first processing into the queues as a function of the determined throughput assigned to each cell, organizing groups of cells generated from queues into a sequence of cells segmented in lists, each list containing the contents of a non-empty queue and the start of each list being identified by a list leader flag associated with the header of the first cell in the list, calculating a determined time interval separating the transmission of two consecutive list leader cells as a function of the resolution time, the rank of the list being processed, the rank of the next non-empty list, the number of cells in the list being processed and the time interval between any two consecutive cells, sequentially transmitting the lists of cells to a network cell transmitter, and wherein in the fourth step consists of loading the time interval separating the transmission of any two consecutive cells into a first network timer associated with the header of each cell in order to perform global cell spacing, and loading the time interval between the transmission of two consecutive list leader cells into a second timer starting after the first timer to perform selective cell spacing, and transmitting a flow of cells generated from the two successive cell spacings into the determined network virtual circuit.

Another purpose of the invention is a device for the embodiment of the method described above.

Its first advantage is that it allows smoothing of throughput peaks in a virtual circuit by forcing a minimum interval between cells, and a second advantage is that it allows management of the throughput allocated to a subscriber determined as a function of his needs by guaranteeing that the subscriber does not exceed the throughput allocated to him, while preventing any overrun of the capacity of a line.

BRIEF DESCRIPTION OF THE DRAWINGS

The invention will be better understood and other characteristics will become clear by reading the following description with reference to the figures in the appendix which show.

DESCRIPTION OF THE INVENTION

Figure 1:
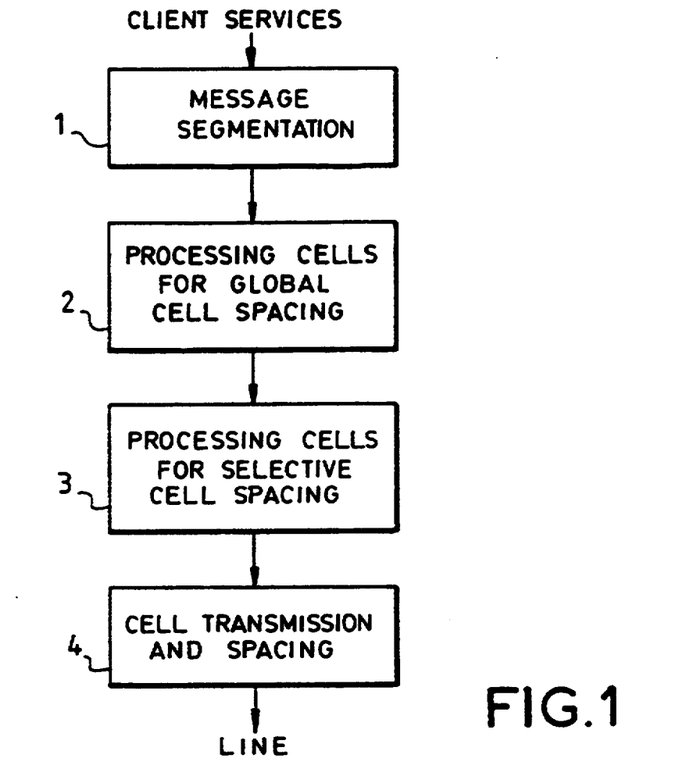
FIG. 1, a block diagram showing steps performed in the method according to the invention, FIG. 2, a synoptic view of the method according to the invention, FIG. 3, a functional diagram showing the method according to the invention, FIG. 4, a block diagram showing the steps performed in the third step of the method according to the invention, FIG. 5, an example of how cells are distributed, FIG. 6, an example of how cell lists are organized, FIG. 7, a block diagram showing steps performed in the fourth step of the method according to the invention, FIG. 8, a functional diagram showing the fourth step in the method according to the invention FIG. 9, a first time chart showing how cells are staggered in time after global cell spacing, FIG. 10, a second time chart showing how cells are staggered in time after selective cell spacing, FIG. 11, a method of making the device embodying the method according to the invention, FIG. 12, an example of how a cell is formatted, FIG. 13, a processing flow chart and FIG. 14, a diagram representing the throughput of a line as a function of time.

The method according to the invention comprises four main steps shown in the block diagram in FIG. 1.

It starts in the first step 1 by segmentation of messages delivered by client services into ATM cells. It continues in the second step 2 with initial processing of the cells obtained in the first step 1 of the method to perform a first cell spacing and in the third step 3 by secondary processing of cells output by the first processing to perform a second cell spacing, and terminates in the fourth step by sending cells to a determined line with spacings between cells that are a function of the throughput allocated to each service.

Some rules must be respected to ensure that the method according to the invention works smoothly:

cells generated by one service are sent one after the other, cells output from different services may be multiplexed in time, the transmission throughput of cells generated by one service must be as close as possible to the throughput allocated to this service, but must never exceed it.

Figure 2:
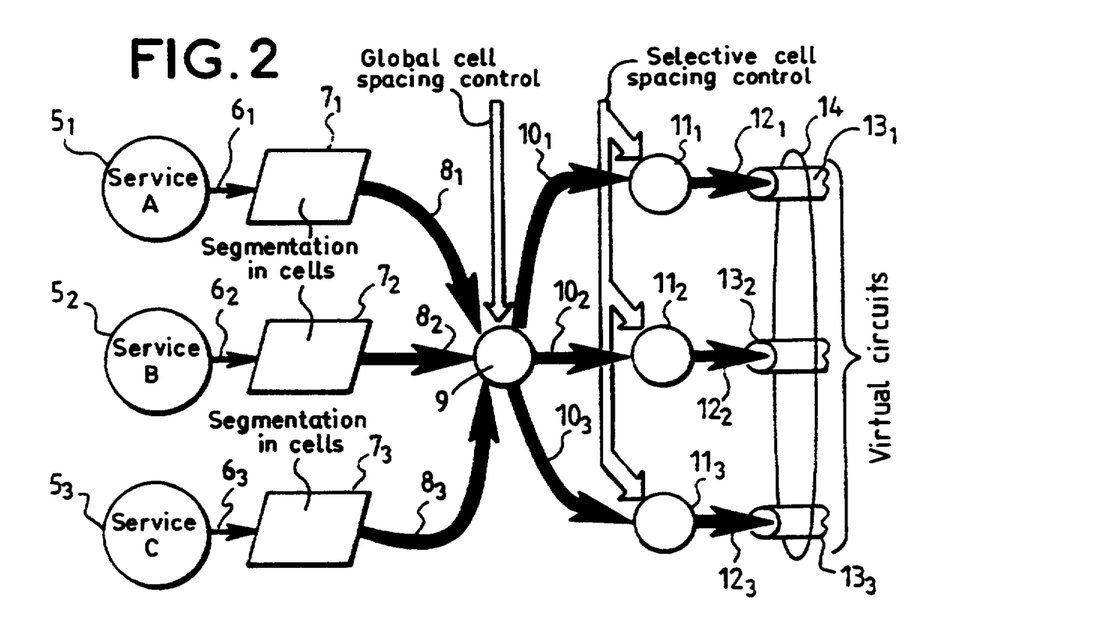

FIG. 2 shows a block diagram of the method according to the invention.

This figure shows a first service A, $5_1$, a second service B, $5_2$, and a third service C, $5_3$, sending data flows $6_1$, $6_2$ and $6_3$ respectively in the form of messages that are injected into the input of segmentation means $7_1$, $7_2$ and $7_3$ respectively, in order to segment messages into cells. The data flows $8_1$, $8_2$ and $8_3$ segmented into cells output from the segmentation means $7_1$, $7_2$ and $7_3$ respectively are sent to a first input of a first cell spacing means 9, hereinafter called global cell spacing, and the second input receives a global cell spacing command. At the output from the first global cell spacing means 9, data flows $10_1$, $10_2$ and $10_3$ are distributed to a first input of a second cell spacing means $11_1$, $11_2$ and $11_3$ respectively, hereinafter called selective cell spacing. Each selective cell spacing means $11_1$, $11_2$ and $11_3$ receives a selective cell spacing command on a second input. Each data flow $12_1$, $12_2$ and $12_3$ output from each selective cell spacing means $11_1$, $11_2$ and $11_3$ respectively is then directed to a determined virtual channel $13_1$, $13_2$ and $13_3$ respectively. The three virtual channels $13_1$, $13_2$ and $13_3$ form a physical transmission line 14 and the various lines used by cells output from a determined circuit form a virtual circuit corresponding to a determined routing through the network between a sending subscriber and a subscriber receiving the same service.

Figure 3:
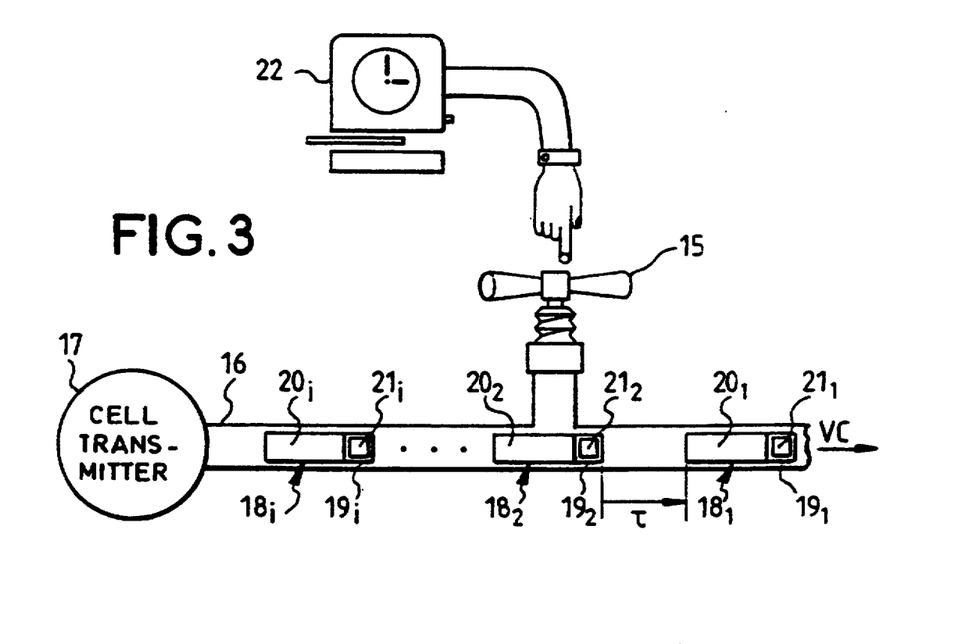

The general principle of cell spacing is illustrated by the simplified functional block diagram in FIG. 3.

On this figure, cell spacing is symbolized by a tap 15 acting on the throughput of a data flow 16 sent by a cell transmitter 17. The data flow 16 is segmented into cells $18_i$ that are routed towards a determined virtual circuit VC that is not shown, at a rate that depends on the opening of the tap 15, represented as a hand, thus managing the throughput of cells $18_i$ in the network.

Each cell $18_i$ comprises a header $19_i$ and a data flow $20_i$. An additional field $21_i$ represented by a small square containing time information corresponding to a determined inter-cell spacing $\tau$ is associated with the header $19_i$ of each cell $18_i$. This time information is output by an information management device not shown on the figure, for example a microprocessor, that manages the distribution of useful throughputs allocated to each service connected to the network. The information $18_1$ contained in the header $19_1$ of the first previous cell $18_1$ that has just been sent and corresponding to the inter-cell spacing between the first transmitted cell $18_1$ and second cell $18_2$ following the first, is loaded into a timer 22. After each transmission, the tap 15 is closed for a time $\tau$. After the time $\tau$ loaded in timer 22 has elapsed, the second cell $18_2$ following the first cell $18_1$ is then transmitted, and so one until all cells $18_i$ have been sent.

The method according to the invention uses two means of cell spacing; the first, also called global cell spacing, guarantees minimum inter-cell spacing between any consecutive cells. It can globally limit the flow of cells sent by a given service and also provides protection against the capacity of a transmission line being exceeded thus preventing information loss.

A second means of cell spacing, also called selective cell spacing, controls the throughput allocated to a determined subscriber or client service to ensure that the throughput allocated to it is not exceeded. A determined virtual circuit is assigned to each client service and, as described previously, the sum of useful throughputs on a determined virtual circuit must match the physical throughput of the transmission line as closely as possible. Therefore selective cell spacing helps to guarantee this matching by imposing a minimum inter-cell spacing as a function of the routing and selective cell spacing parameters for the cells, on determined cells using a determined virtual circuit.

In the first step 1 of the method according to the invention, messages output by client services are decomposed into ATM cells.

The second step 2 consists of initial processing in which a field containing a determined inter-cell spacing is associated with the header of each cell generated in the first step 1, in order to perform the global cell spacing of the cells.

In the third step, cells output from the first processing are subjected to a second processing to perform selective cell spacing. This third step 3 is broken down into four steps illustrated by steps 23 to 26 in the block diagram in FIG. 4.

Figure 4:
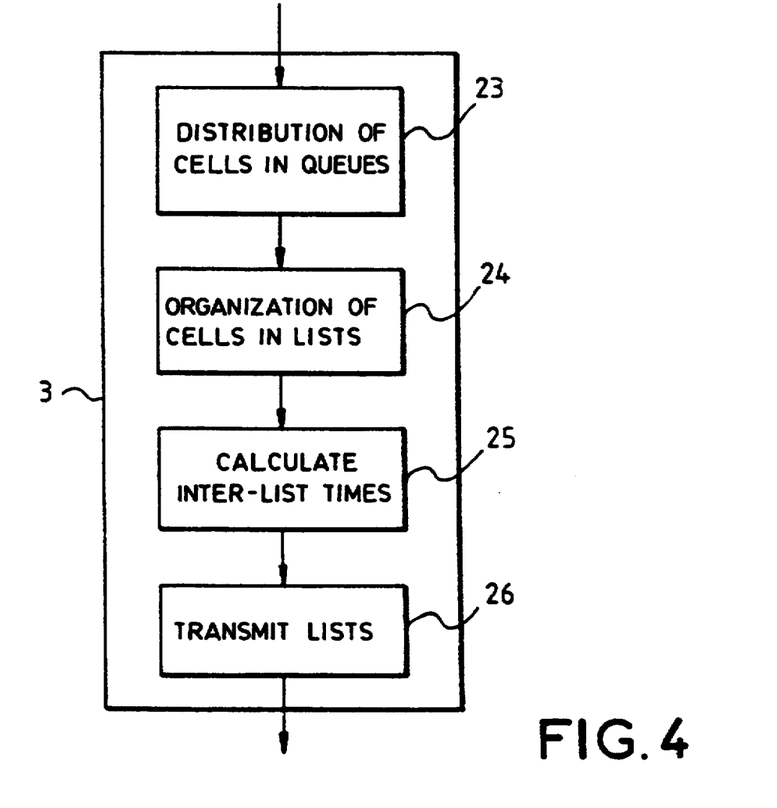

In a first step 23, the „second processing starts by distributing message cells into queues determined as a function of their throughput, and continues in a second step 24 by organizing the cells thus distributed in the form of lists, then in a third step 25 it calculates the spacing between each list hereinafter called the inter-list time, and terminates in a fourth step 36 by transmitting the lists to the fourth step 4 of the method according to the invention.

The first step 23 of the second processing in the method according to the invention consists of assigning a queue corresponding to a determined transmission throughput in a determined virtual circuit to each client service, as soon as a message is delivered after the first processing performed in the second step 2 of the method according to the invention.

Figure 5:
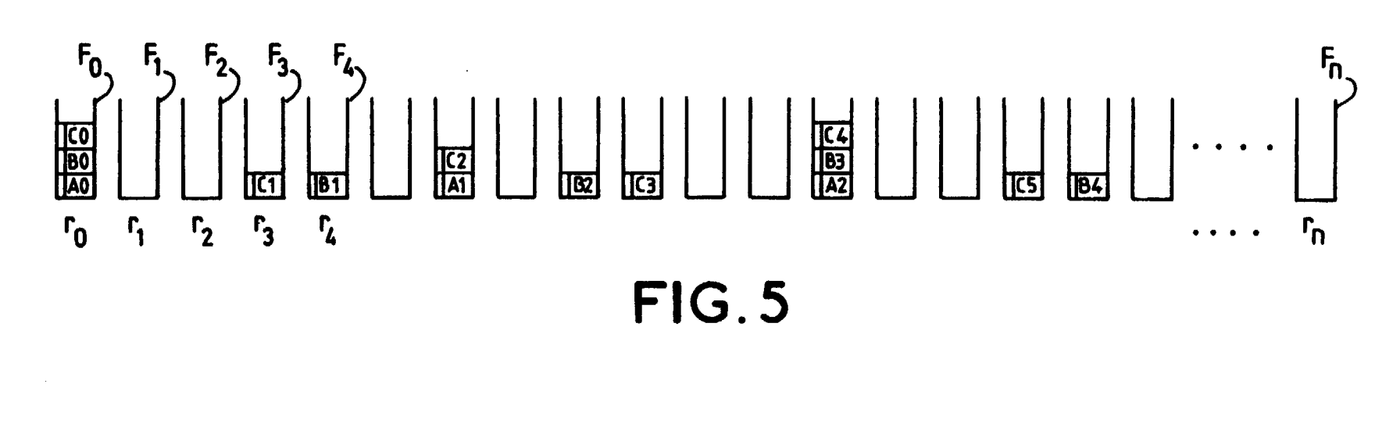

FIG. 5 shows an example of the distribution of cells, represented by a rectangle, of three messages $M_A$, $M_B$ and $M_C$ generated by three client services A, B and C previously inserted in the example in FIG. 2. The cells are distributed into FIFO (First Input First Output) type queues $F_0$ to $F_n$, each schematically shown in the form of a reservoir.

Queues $F_0$ to $F_n$ are ordered in ranks $r_0$ to $r_n$. The first message $M_A$ contains three cells $A_0$, $A_1$ and $A_2$ the second message $M_B$ comprises five cells $B_0$, $B_1$, $B_2$, $B_3$ and $B_4$ and the third message $M_C$ comprises six cells $C_0$, $C_1$, $C_2$, $C_3$ $C_4$ and $C_5$. The first queue $F_0$ of rank $r_0$ contains the first three cells $A_0$, $B_0$ and $C_0$ corresponding to the three messages $M_A$, $M_B$ and $M_C$. The next two queues $F_1$ and $F_2$ of rank $r_1$ and $r_2$ respectively are empty. The fourth queue $F_3$ of rank $r_3$ contains a single cell $C_1$ belonging to the third message $M_C$. The fifth queue $F_4$ of rank $r_4$ contains a single cell $B_1$ belonging to the second message $M_B$, etc.

The second step 24 of the second processing for selective cell spacing consists of organizing cells generated from queues in step 23 in the form of a sequence of cells segmented in lists.

Each list is part of the sequence of cells corresponding to the contents of each queue, and for which the cells will be transmitted sequentially. Each list start is identified by a list leader flag associated with the header of the first cell in the list, hereinafter called the list leader cell. Lists are sent consecutively with the constraint that the inter-list time $T_{il}$, separating transmission on the line of two consecutive list leader cells, is at least equal to a cell spacing method resolution time $T_r$ related to the internal clock of a selective call spacing timer that could, for example, be of the order of $10^{-6}$ sec. A message is eligible if no message from the same queue is already distributed in the lists.

Queues are continuously scanned by an information management device, for example a microcomputer, and eligible message cells are chained with not more that one per list. Lists are spaced by a difference corresponding to a number $N_L$ of lists as a function of the throughput associated with the corresponding queue. The number $N_L$ is defined as the ratio of the inter-list time $T_{il}$ to the resolution time $T_r$.

Figure 6:
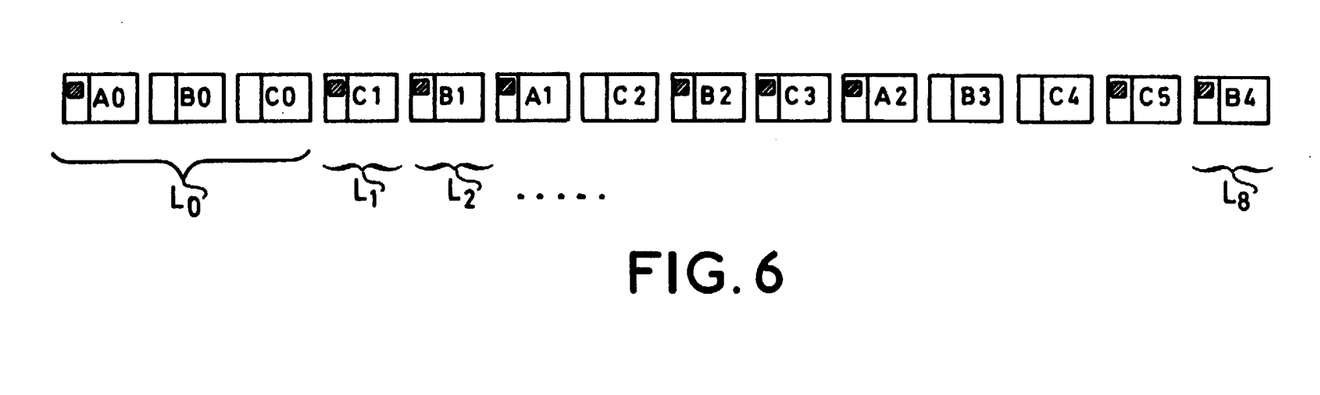

FIG. 6 shows a sequence of cells segmented in lists and uses the example of the three previous messages $M_A$, $M_B$ and $M_C$.

The first list $L_0$ contains the contents of the first queue F0, namely cells $A_0$, $B_0$, $C_0$ in order. The list leader cell $A_0$ contains a list leader flag in its header, shown as a small hashed box.

The second list $L_1$ following the first contains the contents of the next non-empty queue $F_3$, namely a single cell $C_1$ that is also a list leading cell. The third list $L_2$ also contains a single cell $B_1$ and so one until the last list $L_8$ containing the last cell $B_4$ of the second message $M_B$.

The third step 25 of the second processing for selective cell spacing consists of calculating the inter-list time $T_{il}$ before transmitting each new list.

Periodically, for example every millisecond, a determined number of lists is fixed. Each list contains cells belonging to different messages. Empty lists are ignored in the calculation. An inter-list time $T_{il}$ is calculated in order to fix each list. This time is then used in the fourth step 4 of the method according to the invention, that consists of transmitting cells on the line.

Let $r_t$ be the rank of the queue corresponding to the list being processed, $r_s$ the name of the next non-empty list, $N_c$ the number of cells in the list being processed, $T_r$ the resolution time and $T_g$ the global inter-cell spacing, the inter-list time $T_{il}$ is expressed by the following formula:

$$T_{il}=[T_r \cdot (r_s-r_t)]+[(N_c-1) \cdot T_g)] \qquad (1)$$

In the example in FIG. 5, the rank $r_0$ of the corresponding list being processed $L_0$ is equal to 1, rank $r_3$ in the next list $L_1$ is equal to 4, and the number of cells $N_C$ in the list being processed $L_0$ is equal to 3.

The calculation of the inter-list time $T_{il}$ as given by formula (1) then gives the following result:

$$T_{il}=3 \cdot T_r+2 \cdot T_g$$

similarly for the second list: $T_{il}=T_r$ etc.

The calculated inter-list time $T_{il}$ is then written in the first field associated with the header of the list leader cell.

In the fourth and final step 26 of the second processing, cells are transmitted sequentially at a rhythm imposed by the fourth step of the method.

Figure 7:
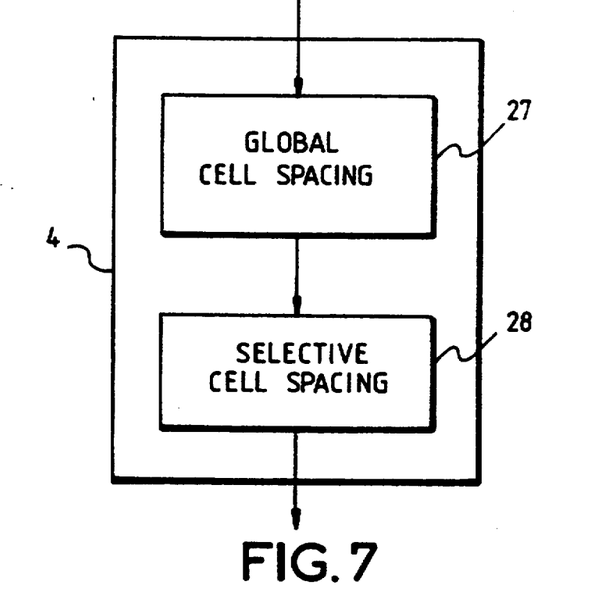

The fourth and final step 4 of the method according to the invention consists of sending cells on the line at a rhythm determined as a function of the global and selective cell spacing parameters acquired in the previous steps 2 and 3 and written in fields associated with the headers of each cell. Step 4 is sub-divided into a first step 27 that performs global cell spacing and a second step 28 that performs selective cell spacing. These two steps 27 and 28 are illustrated by the block diagram in FIG. 7.

Figure 8:
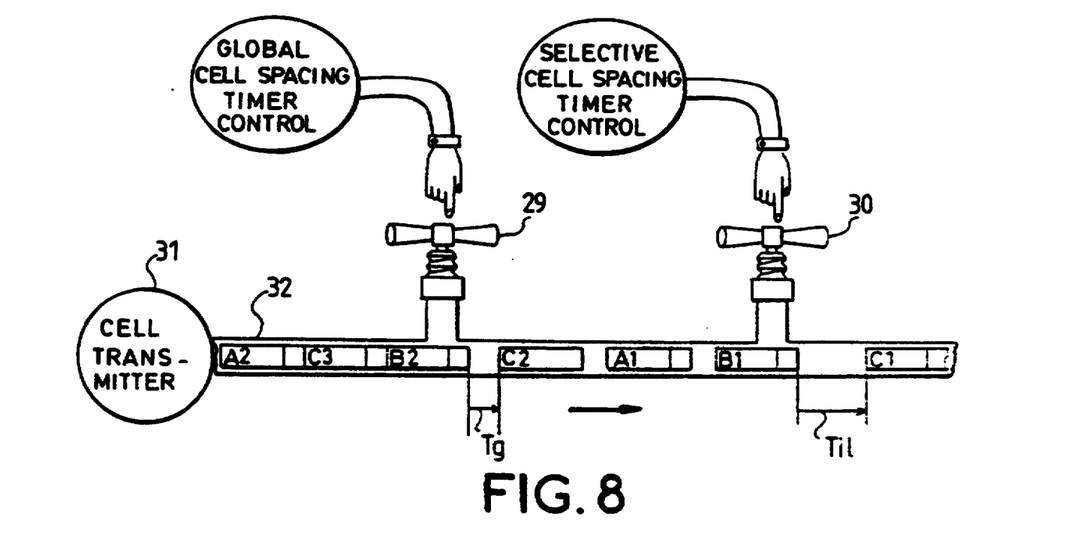

FIG. 8 shows a functional diagram for step 4, in which the timers are not shown. Only the two cell spacing controls are shown symbolically by a hand. A first tap 29 symbolizes global cell spacing and a second tap 30 symbolizes selective cell spacing. A cell transmitter 31 sends a data flow 32 in the direction indicated by the arrow. Cells represented by a rectangle remain in waiting until the first tap 29 is open.

Taking the previous example a first timer, called the global timer, is loaded with a global inter-cell time $T_g$ taken from the cell being processed $C_2$, previously in waiting. The next cell $B_2$ is sent when the global inter-cell time $T_g$ loaded in the timer has elapsed. The next cells $C_3$ and $A_2$ are blocked until the time loaded in the timer taken from cell $B_2$ has expired, etc. The process is renewed for each new cell. This first tap 29 guarantees a minimum time between transmission of each arbitrary consecutive cell.

Cells thus spaced $B_1$, $A_1$ and $C_2$ are once again blocked in waiting Is until the second tap 30 symbolizing selective cell spacing is open.

When a list leader cell $C_1$ shown on FIG. 8 as a small square, is identified in the cell header, the inter-list time $T_{il}$ taken in cell $C_1$ is loaded into the timer called the selective timer. The next cell $B_1$ is blocked in waiting until the inter-list time $T_{il}$ has elapsed. The process is repeated for each new list. This second tap 30 guarantees a determined time between two consecutive non-empty lists.

Figure 9:
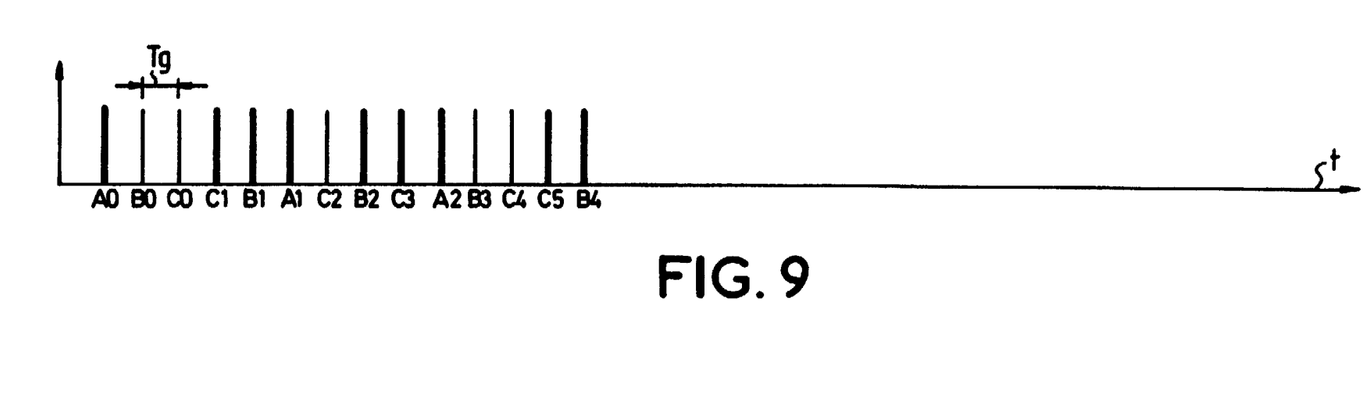

FIG. 9 illustrates a first time diagram showing the separation of cells in time after global cell spacing.

Each cell is represented by a vertical line. Thick lines show list leader cells, and thin lines show cells that are not leader cells.

This time diagram shows the minimum uniform inter-cell spacing $T_g$ between each cell $A_0$ to $B_4$.

Figure 10:
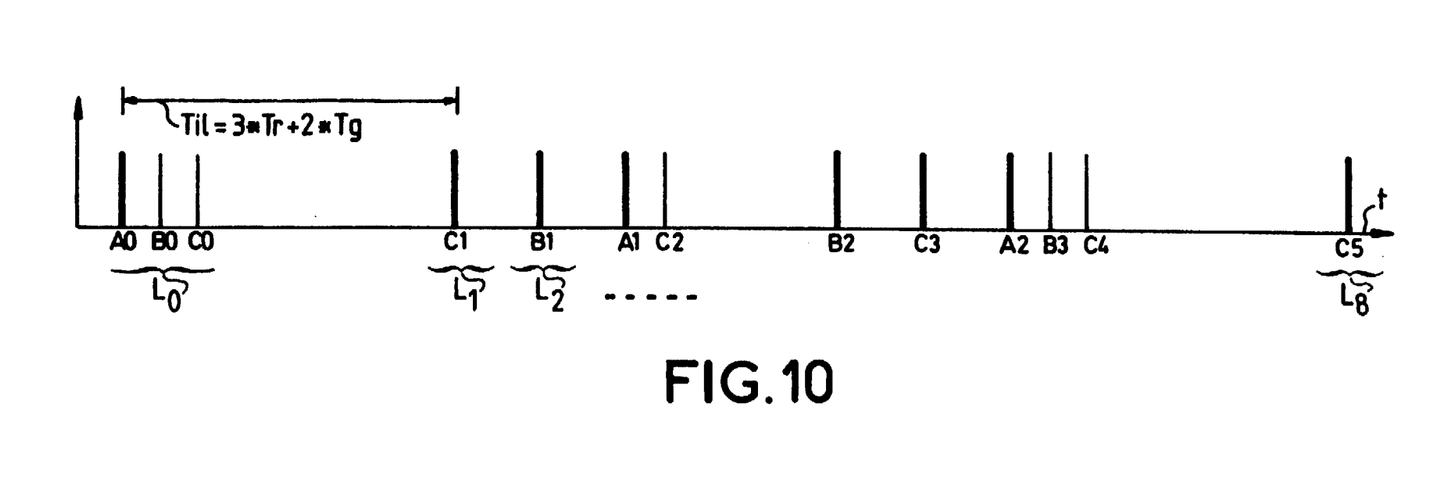

FIG. 10 shows a second time diagram representing the same cells as in the previous figure after selective cell spacing. The minimum inter-cell spacing $T_g$ is maintained between cells in the same list, however the inter-list spacing $T_{il}$ imposed between two list leader cells varies according to formula (1) giving the calculation of the inter-list time $T_{il}$. The calculation is made before sending each new list. In the example in FIG. 10, the first inter-list time $T_{il}$ separating the first list $L_0$ from the second list $L_1$, in other words separating the list leader cell $A_0$ in the first list $L_0$ from the list leader cell $C_1$ in the second list $L_1$, is obtained by applying formula (1) and is equal to $T_{il} = 3.T_r + 2.T_g$.

The same calculation is made between list header cells $C_1$ and $B_1$, $B_1$ and $A_1$ and so on to between $A_2$ and $C_5$.

Figure 11:
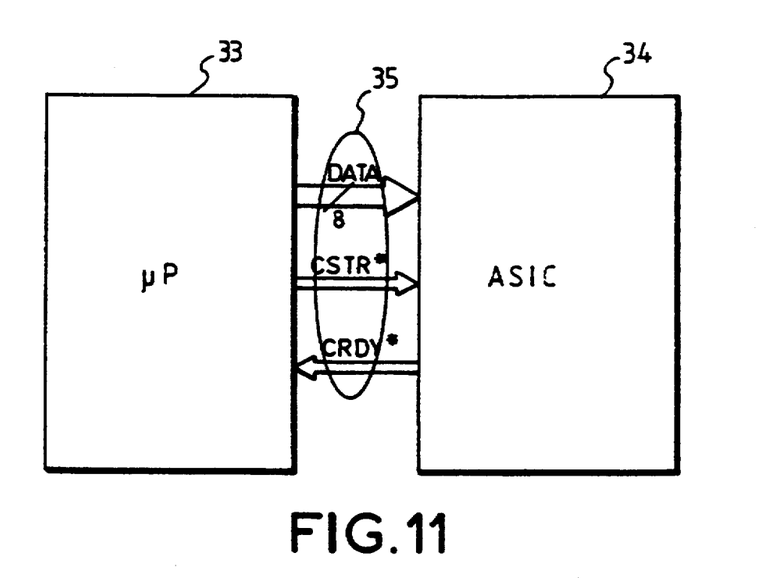

The functional diagram for a method of making a device for the embodiment of the method according to the invention is shown in FIG. 11.

In this construction method, the device contains two main components. The first component 33 is an information management device, for example a microprocessor, and the second component 34 is a wired logic device, for example an ASIC (Application Specific Integrated Circuit).

The microprocessor 33 controls segmenting messages into ATM cells and dialogues with the ASIC 44 that incorporates global and selective cell spacing and the ATM cell transmitter 31, through a communication link 35. This link 35 includes a DATA bus coded on eight bits transmitting cells represented by a sequence of bytes from the microprocessor 33 to the ASIC 34. Each DATA byte sent by the microprocessor 33 is validated by a CSTR* qualification pulse and each DATA byte received by the ASIC 34 is validated by an acknowledgement pulse CRDY*, the two pulses being servo-controlled to each other.

In order to create a determined inter-cell spacing, the ASIC 34 does not output the acknowledgement pulse until the timeout loaded in the timer has elapsed. For example, this exchange may be managed by a processing module located in the ASIC 34.

Figure 12:
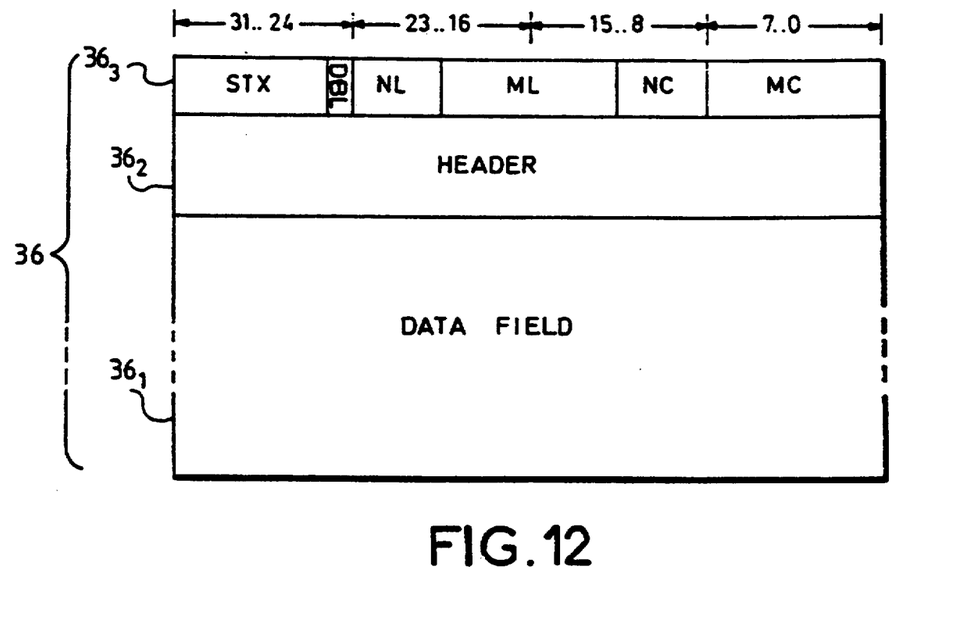

FIG. 12 shows an example of the format of a cell 36 exchanged between the microprocessor 33 and the ASIC 34.

The cell 36 contains a first level $36_1$ corresponding to the data field and a second level $36_2$ corresponding to the header of cell 36. This header $36_2$ is associated with a word $36_3$ forming a third level coded on 32 bits enabling the transmission of different parameters to the ASIC 34. Each of these parameters is coded on a determined number of bits. This word $36_3$ contains the following, starting from the least significant bit towards the most significant bit and from the right toward the left on the figure:

- a first pair of parameters (NC, MC) related to the parameters loaded in the first timer to perform global cell spacing, coded on twelve bits,
- a second pair of parameters (NL, ML) concerning parameters loaded in the second timer to perform selective cell spacing, coded on twelve bits, and
- a list leader flag (DBL), and a synchronization word signaling the start of a cell (STX), all coded on the last eight bits of the word $36_3$ forming the third level.

The timer load time, or the timer delay, is calculated by the following formula:

$$DELAY = 2^{Nx} \cdot Mx \cdot T_b \tag{2}$$

where $0 < Nx < 15$ and $0 < Mx < 255$ and where $T_b$ is the period of the timer internal clock.

Magnitudes Nx and Mx correspond to the (NC, MC) pair when x is equal to C, and to the (NL, ML) pair when x is equal to L.

This formula (2) is a combination of a simple product $Mx.T_b$ and a base 2 exponential function, $2^{Nx}$, and reduces the number of bits coding the parameters Nx and Mx, while maintaining wide dynamics of the time loaded in the timer.

For example, the maximum timer loading time $DELAY_{max}$ is for an internal timer clock period of $T_b = 100$ ns, namely for Nx=15 and Mx=255:

$$DELAY_{max} = 2^{15} \cdot 255 \cdot 10^{-7} \text{ or } DELAY_{max} = 0.835 \text{ sec.}$$

Figure 13:
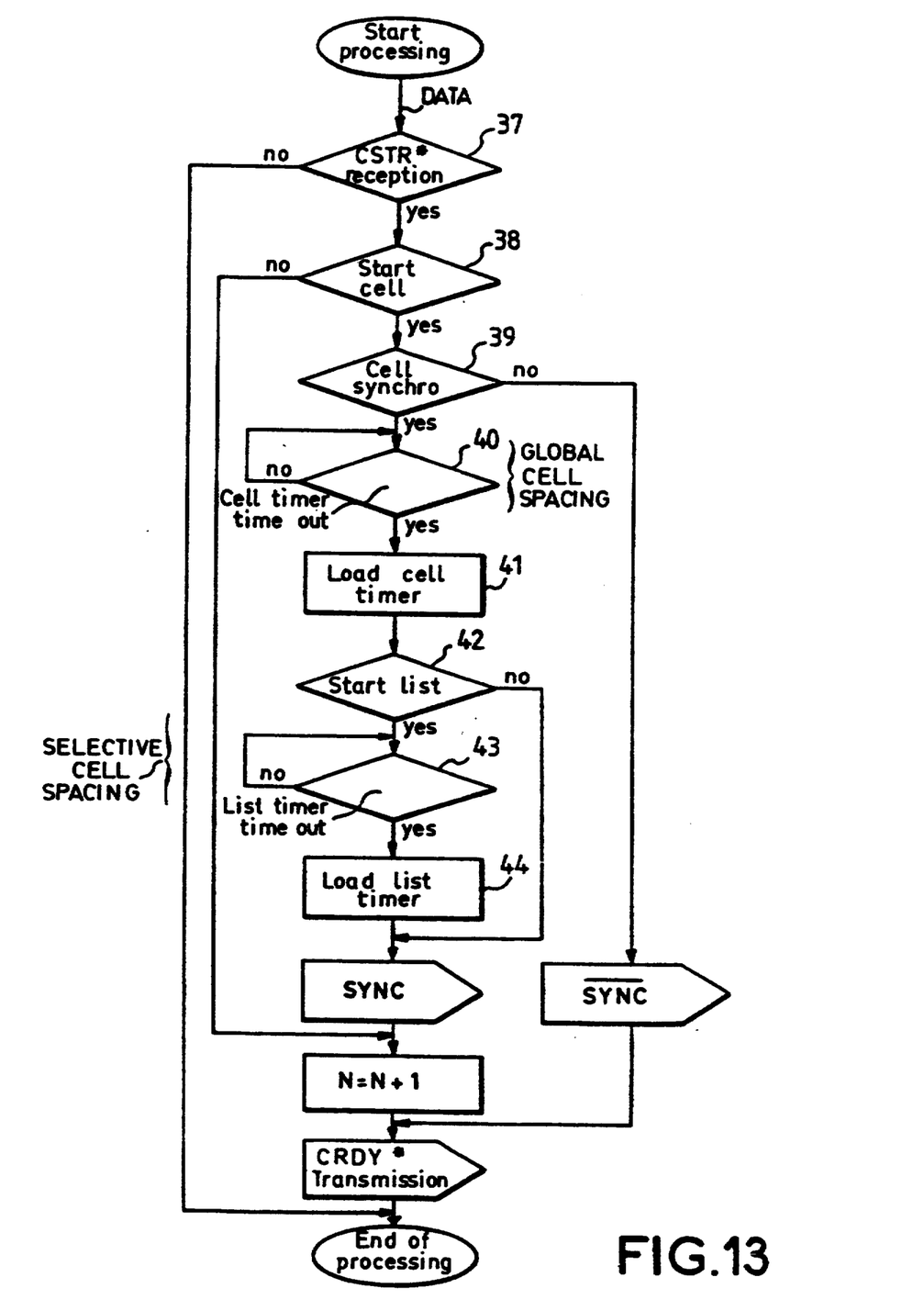

FIG. 13 shows a flow chart of the processing carried out by the ASIC 34.

The processing starts by performing a first test 37 that consists of detecting the presence of a CSTR* qualification pulse for a DATA byte transmission by microprocessor 33. If the result of the first test 37 is negative the processing stops, and if the processing is positive it continues with a second test 38 that consists of detecting the cell start 36: the cell start 36 is defined by the 32-bit word $36_3$ containing the miscellaneous parameters associated with the cell 36 header $36_2$. An order number is therefore associated with each cell 36 at each 32-bit word $36_3$. The first word in the first cell 36 transmitted is numbered "0". The ASIC 34 includes a counter not shown, initialized to 0 that recognizes the first cell start 36 if the word $36_3$ encountered is actually numbered "0" allowing the processing to continue, otherwise the ASIC 34 counter is incremented, N=N+1, and it generates an acknowledgement pulse CRDY* to microprocessor 33 enabling a new DATA byte to be sent. If the result of the second test 38 is positive, the processing continues with a third test 39 that consists of detecting if the synchronization word STX signaling a cell start 36 is set. If the result of the third test 39 is negative, a non-synchronization flag SYNC is triggered and the ASIC 34 transmits an acknowledgement pulse CRDY* to the microprocessor 33 to process a new DATA byte without incrementing the ASIC 34 counter. If the result is positive the processing continues with a fourth test 40 that consists of checking if the time loaded in the global cell spacing timer has expired. The fourth test 40 is repeated until the time is expired. When the time has expired, the processing authorizes loading 41 a new timer carried by a new cell 36, into the global cell spacing timer. This test 40 corresponds to the global cell spacing symbolized by the first tap 29 shown on FIG. 8.

The processing continues with a fifth test 42 that consists of detecting the presence of a list start flag DBL in cell 36. If the result is negative, a synchronization flag SYNC is activated and the ASIC 34 counter is incremented, N=N+1, before the CRDY* transmission of a new DATA byte. If the result is positive, in other words if a list leader flag, DBL is detected, the processing continues with the sixth test 43. If result of the sixth test 43 is negative, test 43 is repeated until the time loaded in the timer used for selective cell spacing has elapsed. This test 43 corresponds to selective cell spacing symbolized by the second tap 30 shown on FIG. 8. If the result is positive, a new inter-list time $T_{il}$ is loaded at step 44 in the second timer, or selective cell spacing timer, and the synchronization indicator SYNC checks the synchronization of cells in the flow of DATA bytes on the communication link 35. The processing then continues by incrementing the ASIC 34 counter, $N=N+1$, and a new DATA byte is transmitted by microprocessor 33 to the ASIC 34. The processing continues until there are no more cells 36 making up the messages.

Figure 14:
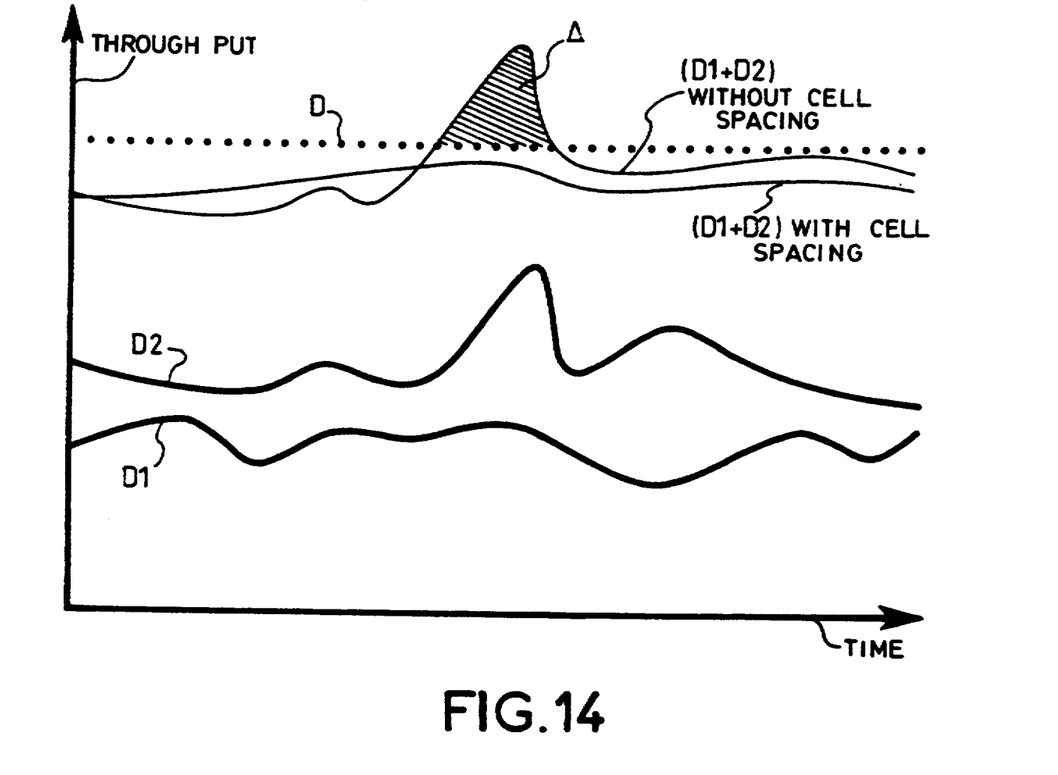

FIG. 14 shows a diagram representing an example of how the throughput on a line, shown as the ordinate, varies as a function of the time, shown as the abscissa.

In this example two client services $S_1$ and $S_2$ are multiplexed on the same line with two different throughputs $D_1$ and $D_2$ respectively, where $D_2>D_1$. The maximum physical throughput threshold D allowed on the line is shown as a solid horizontal line. The curve representing the sum of the two throughputs, $D_1+D_2$, without cell spacing exceeds the threshold when a peak appears in the throughput of service $S_2$. The overrun area $\Delta$ is shown hashed.

The method according to the invention brings the sum of the two throughputs $D_1+D_2$ without cell spacing below the maximum physical throughput D allowed on the line. A new curve $D_1+D_2$ with cell spacing shows how the previous curve is smoothed out.

What is claimed is:

1. A method of managing the throughput of digitally coded messages transported through an asynchronous network between at least one sending subscriber and one receiving subscriber, consisting of a first step of segmenting messages sent by the sender subscriber into cells, a second step performing initial processing on each cell in order to space them uniformly by a minimum time interval equal to at least a given resolution time, a third step performing secondary processing after the first step in order to space groups of cells with the same throughput by a minimum time interval determined as a function of the throughput allocated to each network subscriber, and a fourth step in which the cells thus spaced are transmitted in a determined virtual circuit in the network, wherein the initial processing of cells in the second step consists of combining the header of each cell with a time field containing time information corresponding to the minimum imposed interval between any two consecutive cells transmitted in the network, and the secondary processing of cells in the third step consists of assigning a queue to each subscriber corresponding to a determined transmission throughput in the determined virtual circuit, and then distributing cells generated by the first processing into the queues as a function of the determined throughput assigned to each cell, organizing groups of cells generated from queues into a sequence of cells segmented in lists, each list containing the contents of a non-empty queue and the start of each list being identified by a list leader flag associated with the header of the first cell in the list, calculating a determined time interval separating the transmission of two consecutive list leader cells as a function of the resolution time, the rank of the list being processed, the rank of the next non-empty list, the number of cells in the list being processed and the time interval between any two consecutive cells, sequentially transmitting the lists of cells to a network cell transmitter, and wherein in the fourth step consists of loading the time interval separating the transmission of any two consecutive cells into a first network timer associated with the header of each cell in order to perform global cell spacing, and loading the time interval between the transmission of two consecutive list leader cells into a second timer starting after the first timer to perform selective cell spacing, and transmitting a flow of cells generated from the two successive cell spacings into the determined network virtual circuit.

2. A device for managing throughput of digitally coded messages transported through an asynchronous network between at least one sending subscriber and one receiving subscriber, said device comprising:

a first means for segmenting messages into cells;

a second means for receiving said cells and imposing a global determined time spacing between any two consecutive cells;

a third means for distributing cells generated by said second means to queues as function of throughput assigned to each cell and including a means for organizing groups of cells generated from said queues into a sequence of cells segmented in lists;

fourth means for imposing a selective cell spacing determined time interval between two consecutive lists; and fifth means responsive to said second means and said fourth means to transmit cells in a determined virtual circuit of said network at a rate imposed as a function of said global cell determined time spacing and said selective cell determined time spacing of said second and said fourth means.

3. Device according to claim 2, wherein the second means comprises a first timer loaded with a global cell spacing time associated with the header of each cell, and wherein the fourth means comprises a second timer loaded with a selected cell spacing time calculated starting from information associated with the header of each list leader cell, and the fifth means comprises a cell transmitter that transmits a flux of cells sequentially in the network ahead of the first timer and a device for the management of the information contained in each cell to control the first timer and the second timer as a function of a duration written in each cell.

4. Device according to claim 3 wherein the first message segmentation means is included in the fifth means information management device, and the second means, the third means and the fourth means cell transmitter are integrated in a wired logic device.

5. Device according to claim 4 wherein the information management device is a microprocessor and the wired logic device is an ASIC (Application Specific Integrated Circuit), the two devices dialoguing with each other through a communication link containing a data bus, a bus for validation of data transmission by the microprocessor, and a bus for validation of reception by the ASIC.

* * * * *